United States Patent
Shimada et al.

(10) Patent No.: US 10,334,218 B2
(45) Date of Patent: Jun. 25, 2019

(54) VIDEO REPRODUCTION DEVICE AND VIDEO REPRODUCTION METHOD

(71) Applicant: MITSUBISHI ELECTRIC CORPORATION, Tokyo (JP)

(72) Inventors: Masaaki Shimada, Tokyo (JP); Nobuo Takeshita, Tokyo (JP); Kosuke Yagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/566,308

(22) PCT Filed: Jun. 22, 2016

(86) PCT No.: PCT/JP2016/068496
§ 371 (c)(1),
(2) Date: Oct. 13, 2017

(87) PCT Pub. No.: WO2016/208616
PCT Pub. Date: Dec. 29, 2016

(65) Prior Publication Data
US 2018/0115761 A1    Apr. 26, 2018

(30) Foreign Application Priority Data

Jun. 25, 2015  (JP) ................ 2015-127784

(51) Int. Cl.
*H04N 9/87*     (2006.01)
*G11B 20/10*   (2006.01)
(Continued)

(52) U.S. Cl.
CPC .......... *H04N 9/87* (2013.01); *G11B 20/10* (2013.01); *G11B 20/10009* (2013.01);
(Continued)

(58) Field of Classification Search
CPC  H04N 9/87; H04N 5/76; H04N 5/783; H04N 9/7925; G11B 20/10; G11B 20/10009; G11B 20/10527; G11B 27/005
See application file for complete search history.

(56) References Cited

U.S. PATENT DOCUMENTS 6,289,162 B1 *  9/2001  Uehara ............... H04N 5/783
                                                             386/205
9,131,202 B1 *  9/2015  Espeset ............... H04N 9/8045
(Continued)

FOREIGN PATENT DOCUMENTS

JP  59-54390 A    3/1984
JP  11-234583 A   8/1999
(Continued)

OTHER PUBLICATIONS

Office Action dated Jul. 24, 2018 in corresponding Japanese Patent Application No. 2017-524941.
(Continued)

*Primary Examiner* — Thai Q Tran
*Assistant Examiner* — Sunghyoun Park
(74) *Attorney, Agent, or Firm* — Birch, Stewart, Kolasch & Birch, LLP

(57) ABSTRACT

A video reproduction device (100) reproduces expanded video data ($D_{V1}$) whose brightness dynamic range is wider than a standard video. The video reproduction device (100) includes a brightness information adjustment unit (150). The brightness information adjustment unit (150) changes first output brightness levels of the expanded video data ($D_{V1}$) to second output brightness levels. When the expanded video data ($D_{V1}$) is reproduced at a second reproduction speed faster than a first reproduction speed which is a normal
(Continued)

speed, the brightness information adjustment unit (150) reduces the first output brightness levels to the second output brightness levels.

14 Claims, 12 Drawing Sheets

(51) Int. Cl.
    *H04N 5/76*     (2006.01)
    *G11B 27/00*     (2006.01)
    *H04N 9/79*     (2006.01)
    *H04N 5/783*     (2006.01)

(52) U.S. Cl.
    CPC ...... *G11B 20/10527* (2013.01); *G11B 27/005* (2013.01); *H04N 5/76* (2013.01); *H04N 5/783* (2013.01); *H04N 9/7925* (2013.01)

(56) References Cited

U.S. PATENT DOCUMENTS

| | | | | |
|---|---|---|---|---|
| 9,451,328 | B1* | 9/2016 | Grove | H04N 21/4325 |
| 2008/0037953 | A1* | 2/2008 | Kawamura | H04N 5/783 |
| | | | | 386/343 |
| 2008/0155474 | A1* | 6/2008 | Duhig | G06F 3/0482 |
| | | | | 715/830 |
| 2010/0220974 | A1* | 9/2010 | Yamashita | G11B 27/005 |
| | | | | 386/344 |
| 2016/0100183 | A1 | 4/2016 | Yamamoto et al. | |
| 2016/0232937 | A1 | 8/2016 | Yamamoto et al. | |
| 2017/0062005 | A1* | 3/2017 | Kolesnikov | G11B 27/005 |
| 2018/0144693 | A1 | 5/2018 | Saito | |

FOREIGN PATENT DOCUMENTS

| | | |
|---|---|---|
| JP | 2004-7832 A | 1/2004 |
| JP | 2009-55156 A | 3/2009 |
| JP | 2014-531821 A | 11/2014 |
| JP | 2015-005878 A | 1/2015 |
| JP | 2017-005310 A | 1/2017 |
| KP | 2018-0012291 A | 2/2018 |
| WO | WO 2014/203747 A1 | 12/2014 |
| WO | 2015/045910 A1 | 4/2015 |

OTHER PUBLICATIONS

Office Action dated Jan. 29, 2019 in corresponding Korean Patent Application No 10-2017-7036169.

* cited by examiner

Fig. 5

310 ~ Reproduction control information file( ){

// General disc information
  Studio_ID ~ 501
  Disc_ID ~ 502

// Playlist information
num_of_playlist ~ 503
for( i=0; K num_of_playlist; i++ ){
  flag_HDR, ~ 504
  Max_LL, ~ 505
  Max_Ave_LL, ~ 506
  MasterMonitorInfo, ~ 507
  num_of_playitem, ~ 508
  for( i=0; K num of playitem; i++ ){
    Stream file name; ~ 509
    Reproduction start time; ~ 510
    Reproduction end time; ~ 511
  }
}

// Stream information
num_of_stream ~ 512
for( n=0; nK num_of_stream; n++ ){
  Stream information file name ~ 513
  Attribute information management table( ) ~ 514
  Access point management table( ) ~ 515
}
}

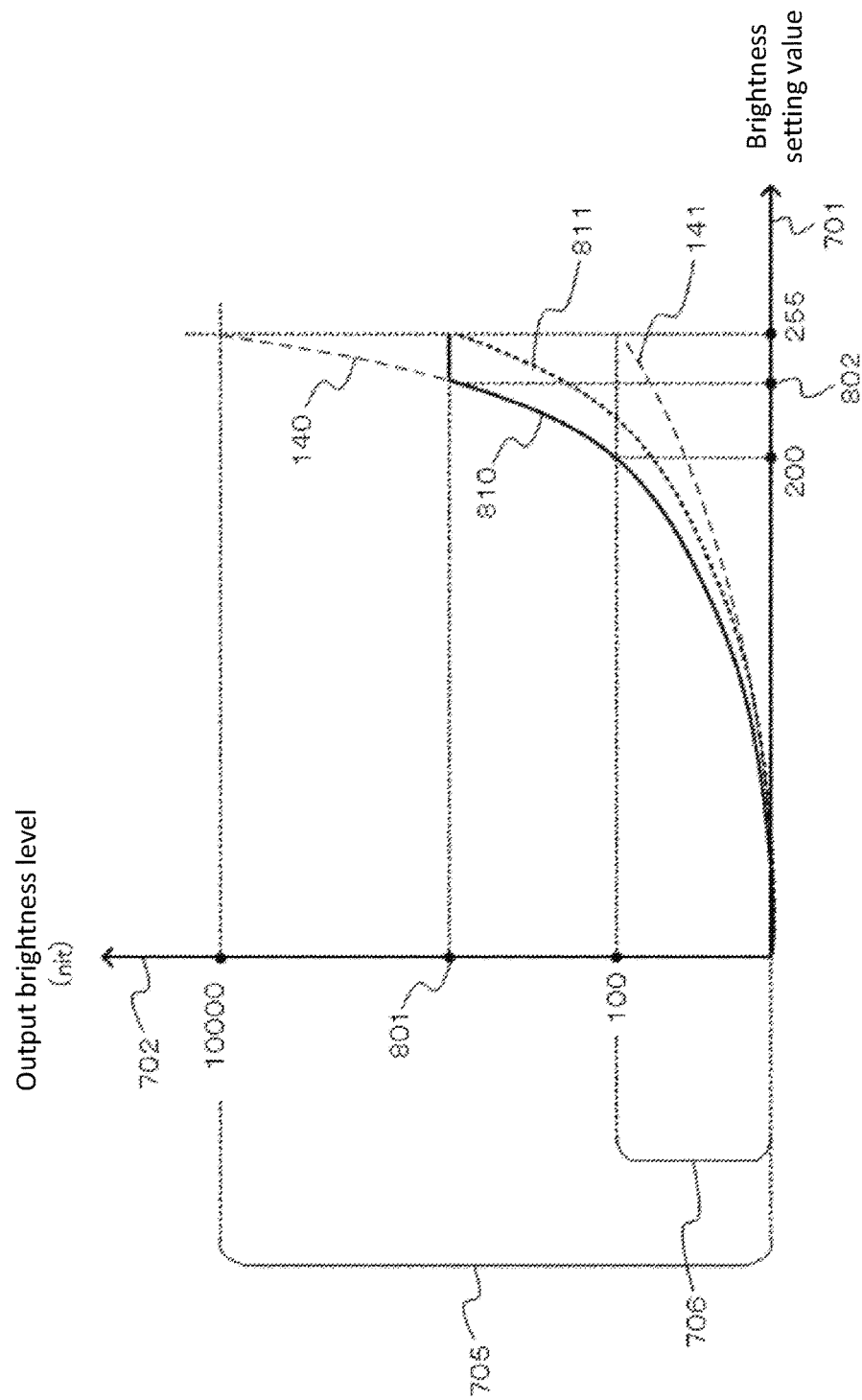

Fig. 9

| No | Optical disc | Display | System's actions |
|---|---|---|---|
| Case: 1 | SDR | SDR | • Reproduction device outputs decoded brightness value (SDR system) intact to display device<br>• HDMI signals are transmitted as SDR signals to display device<br>• Display device displays at output brightness level as SDR system's brightness value |
| Case: 2 | SDR | HDR | • Reproduction device outputs decoded brightness value (SDR system) intact to display device<br>• HDMI signals are transmitted as SDR signals to display device<br>• Display device internally converts to brightness value (HDR) and displays at output brightness level as HDR system's brightness value |
| Case: 3 | HDR | SDR | • Reproduction device internally converts decoded brightness value (HDR) to brightness value (SDR) and outputs to display device<br>• HDMI signals are transmitted as SDR signals to display device<br>• Display device displays at output brightness level as SDR system's brightness value |
| Case: 4 | HDR | HDR | • Reproduction device outputs decoded brightness value (HDR system) intact to display device<br>• HDMI signals are transmitted as HDR signals to display device<br>• Display device displays at output brightness level as HDR system's brightness value |

901
902
903
904

US 10,334,218 B2

VIDEO REPRODUCTION DEVICE AND VIDEO REPRODUCTION METHOD

TECHNICAL FIELD

The present invention relates to a video reproduction device and a video reproduction method.

BACKGROUND ART

Under traditional optical disc standards, videos have been authored on the premise that they are viewed using standard brightness (100 nits) monitors. In recent years, however, monitors which are capable of expressing high brightness over 10000 nits exceeding the standard have been introduced in the market. Also, the request has been raised for viewing high quality video images with such a wide-dynamic-range monitor. A video reproduction device is known which is capable of displaying such wide brightness dynamic range contents at adequate brightness (for example, Patent Document 1).

Patent Document 1 has disclosed a technique to convert brightness values of HDR video recorded in the optical disc into optimum brightness values at which the monitor can display the video in accordance with the monitor's display performance or the monitor's identification information.

Video images authored at the standard brightness are called SDR (Standard Dynamic Range) video. Video images capable of expressing high brightness are called HDR (High Dynamic Range) video. The HDR video is a video content capable of expressing images with a wide brightness dynamic range. With its high maximum-expressible-brightness, the HDR video is capable of expressing high brightness images such as the glitter of the sun or the reflection of light.

In order to display HDR videos, an HDR-video-compatible display is necessary.

PRIOR ART DOCUMENT

Patent Document

Patent Document 1: International Publication WO2015-045916 (pages 2 to 6, FIG. 2)

SUMMARY OF THE INVENTION

Problem to be Solved by the Invention

In the case where a video is reproduced at a normal speed, the conventional video reproduction device disclosed in Patent Document 1 adjusts the brightness of the content having a wide brightness dynamic range into brightness values at which the monitor can display the video. Therefore, in a case of special reproduction such as fast-forward, rewind, slow-reproduction, and still-reproduction, the video reproduction device according to Patent Document 1 does not adjust brightness values. Especially when HDR video is fast-forwarded, highly bright spots rapidly move, to easily cause the viewer's eye-fatigue.

Means for Solving Problem

A video reproduction device of the present invention is a video reproduction device capable of reproducing expanded video data having a wider brightness dynamic range than standard video; the video reproduction device includes a brightness information adjustment unit to change brightness information of the expanded video data according to a tonemap defining correspondence relation between brightness values and output brightness levels, wherein, when the expanded video data is reproduced at a faster reproduction speed than a normal reproduction speed, the output brightness level are reduced according to the tonemap.

EFFECT OF THE INVENTION

With the configuration described above, a video reproduction device can be provided which allows viewers to enjoy high quality and high brightness videos with less eye-fatigue.

BRIEF DESCRIPTION OF THE DRAWINGS

FIG. 5 is an explanatory description of syntax of a reproduction control information file.

FIG. 8 shows a graph for explaining generation of an expanded tonemap.

FIG. 9 is an explanatory table about the system's actions taken in each combination of an optical disc for HDR video or SDR video with a display device for HDR video or SDR video.

EMBODIMENT FOR CARRYING OUT THE INVENTION

Embodiment 1

An encoded-video reproduction device 100 according to Embodiment 1 changes output brightness levels of an HDR video when the HDR video images are reproduced at a higher reproduction speed, whereby eye-fatigue caused by flickering bright spots can be reduced.

HDR videos are also called expanded videos, and SDR videos are also called standard videos.

Figure 1:
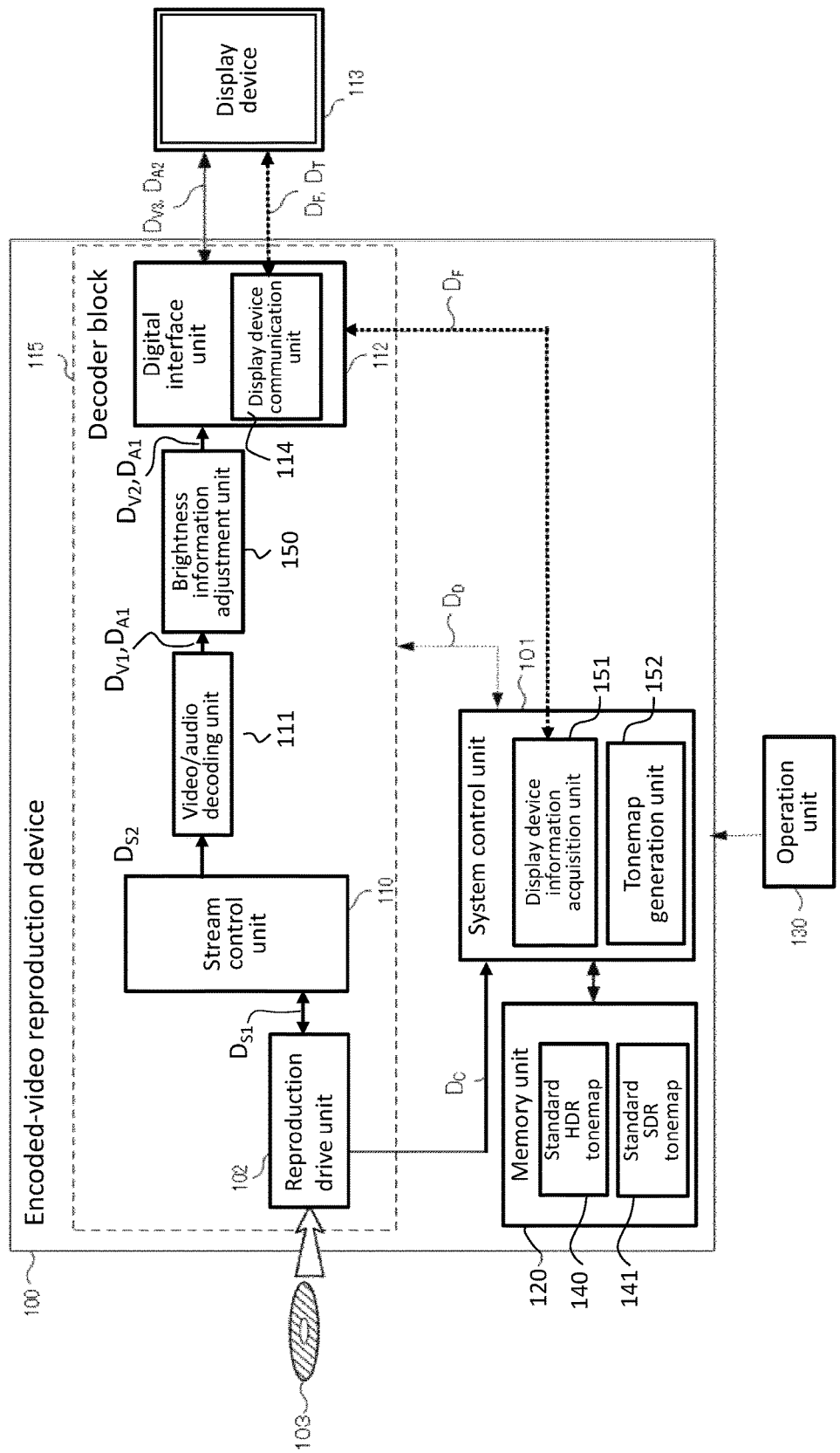
FIG. 1 is a system configuration diagram of an encoded-video reproduction device according to Embodiment 1.

FIG. 1 is a system configuration diagram of the encoded-video reproduction device 100 according to the present invention. In general, video images are compressed, so an example of a video reproduction device is explained here as "an encoded-video reproduction device".

The encoded-video reproduction device 100 includes a brightness information adjustment unit 150.

The encoded-video reproduction device 100 may include a display device information acquisition unit 151 and a tonemap generation unit 152. The display device information acquisition unit 151 and the tonemap generation unit 152 are components of a system control unit 101. In other words, the encoded-video reproduction device 100 may include the system control unit 101.

Also, the encoded-video reproduction device 100 may include a stream control unit 110, a video/audio decoding unit 111, a digital interface unit 112, and a memory unit 120. The digital interface unit 112 includes a display device communication unit 114. The memory unit 120 includes a standard HDR tonemap 140 and a standard SDR tonemap 141.

In the embodiment, processes using the tonemaps 140 and 141 are explained for example. Instead of using the tonemap 140 or 141, the relation between brightness setting values 701 and output brightness levels 702 can be obtained using a numerical expression such as a function.

The encoded-video reproduction device 100 may include a reproduction drive unit 102. The reproduction drive unit 102 reads out information recorded on an optical disc 103. The optical disc 103 is, for example, a BD (Blu-ray Disc (registered trademark)) or a DVD (registered trademark).

The system control unit 101 integratedly controls the entire encoded-video reproduction device 100. The system control unit 101 sends a decoder control signal $D_D$ to a decoder block 115. The system control unit 101 receives the decoder control signal $D_D$ from the decoder block 115.

In the optical disc 103, stream information $D_{S1}$ which is multiplexed encoded-video and reproduction control information $D_C$ of the stream information $D_{S1}$ are record, both of which will be described later. In short, the optical disc 103 includes the stream information $D_{S1}$ and the reproduction control information $D_C$. "The reproduction control information" includes information such as attribute information of video, attribute information of audio, and information showing a correspondence relation between reproduction start time information and reproduction start position information. The attribute information of video is about an encoded video stream separated from the stream information recorded in the optical disc 103. The attribute information of audio is about an encoded audio stream. The information showing the correspondence relation between the reproduction start time information and the reproduction start position information is recorded per access unit (normally per GOP).

In Embodiment 1, explanation will be made assuming that the reproduction drive unit 102 is, for example, an optical disc drive reading device. The reproduction drive unit 102, however, may be a hard disc drive device or an SD medium drive device. In those cases, the stream information $D_{S1}$ and the reproduction control information $D_C$ are record in the hard disc drive or in the SD medium. The information is read out through the reproduction drive unit 102.

The stream information $D_{S1}$ and the reproduction control information $D_C$ of the stream information $D_{S1}$, both recorded in the optical disc 103, can also be obtained via broadcasting or streaming.

"Streaming" is a method for viewing and/or listening multimedia data such as video or audio by reproducing the data, simultaneously receiving the data via a network such as the Internet.

Next, the flow of a reproduction process in Embodiment 1 will be explained.

When reproducing stream information $D_{S2}$ recorded in the optical disc 103 which is encoded and compressed stream information such as MPEG2-TS (MPEG2-Transport Stream), the system control unit 101 reads out in advance reproduction control information $D_C$ which relates to the stream information $D_{S2}$ of the reproduction object.

The system control unit 101 saves the read-out reproduction control information $D_C$ in the memory unit 120 in order to be able to read the reproduction control information $D_C$ quickly. The system control unit 101 reads out the reproduction control information $D_C$ saved in the memory unit 120 and commands related units to get ready for reproduction.

Then, the system control unit 101 reads out the stream information $D_{S1}$ recorded in the optical disc 103. Then, the system control unit 101 provides the video/audio decoding unit 111 with the stream information $D_{S2}$ via the stream control unit 110. The stream control unit 110 integrally controls the flows of the stream information $D_{S1}$ and $D_{S2}$ in the entire system. The stream control unit 110 selects the stream information $D_{S2}$ of the encoded and compressed video from the stream information $D_{S1}$. Then, the stream control unit 110 extracts the stream information $D_{S2}$ from the stream information $D_{S1}$.

After successively receiving the stream information $D_{S2}$, the video/audio decoding unit 111 divides the stream information $D_{S2}$ into an encoded and compressed video stream and an encoded and compressed audio stream. Then, the video/audio decoding unit 111 decodes the video stream encoded using MPEG2 or the like, into video signals $D_{V1}$.

Also, the video/audio decoding unit 111 similarly decodes the audio stream encoded using AC-3 or the like, into audio signals $D_{A1}$.

The encoded-video reproduction device 100 according to Embodiment 1 changes video's brightness levels, thus it does not necessarily require processing in relation to the audio stream.

Then, the decoded video signals $D_{V1}$ and the decoded audio signals DAI are outputted to the brightness information adjustment unit 150.

The brightness information adjustment unit 150 changes brightness information of the expanded video data $D_{V1}$. For example, when special reproduction of an HDR video is performed, the brightness information adjustment unit 150 converts brightness values of the decoded video signals $D_{V1}$ outputted from the video/audio decoding unit 111 according to a later-described expanded tonemap.

Then, the brightness information adjustment unit 150 outputs the decoded video information (video signals $D_{V2}$) whose brightness values have been converted, to the digital interface unit 112.

The expanded tonemap provides conversion information for converting brightness setting values to respective output brightness levels. Tone mapping is a method for obtaining video images of a standard dynamic range through, for example, compressing or rearranging its dynamic range higher than the standard. The tonemap is used for tone mapping.

With respect to the audio information (audio signals $D_{A1}$), the brightness information adjustment unit 150 keeps intact the output signals received from the video/audio decoding unit 111 to output them to the digital interface unit 112.

The digital interface unit 112 converts the provided video signals $D_{V2}$ and audio signals $D_{A1}$ into signals in conformity with the HDMI (registered trademark) interface.

The display device 113 is a display for viewing video images expressed in video signals $D_{V3}$ converted to HDMI signals and for listening to audio expressed in audio signals $D_{A2}$ converted to HDMI signals.

When outputting the video signals $D_{V3}$ and the audio signals $D_{A2}$, the encoded-video reproduction device 100 transmits video attribute information $D_T$ (control information) to the display device 113 via the display device communication unit 114.

The video attribute information Dr is information about the video signals $D_{V3}$ which is specified in the HDMI standard. The video attribute information $D_T$ includes information about the video signals $D_{V3}$, such as information about the presence or absence of HDR video, information about the maximum output brightness level, and information about the mastering environment.

The video attribute information $D_T$ is transmitted to the display device 113 during a blanking period.

The display device information acquisition unit 151 obtains a displayable format $D_F$ via the display device communication unit 114. The displayable format $D_F$ includes information about display performance of the display device 113. The displayable format $D_F$ also includes information about the display device 113 such as information about its compatibleness with HDR video, and information about the maximum output brightness level, the recommended maximum brightness level, manufacturer's name, the year of manufacture, the displayable resolution, and the compatibleness with the interlace mode.

The displayable format $D_F$ of the display equipment 113 is recorded in a non-volatile memory as EDID (Extended Display Identification Data).

In Embodiment 1, an example is being explained in which the HDMI standard is used. Here it is only necessary, however, to obtain the displayable format $D_F$ of the display device 113. Therefore, iLink, infrared communication or the like may be used to obtain the format.

In Embodiment 1, the example is shown in which the display device communication unit 114 is in the digital interface unit 112. The display device communication unit 114, however, may not necessarily be in the digital interface unit 112.

Upon a command from the system control unit 101, the decoder block 115 records or reproduces the stream information. The "decoder block" is a general term for the recording and reproducing functions of the video stream and the audio stream.

In FIG. 1, for example, the decoder block 115 includes the reproduction drive unit 102, the stream control unit 110, the video/audio decoding unit 111, the brightness information adjustment unit 150, and the digital interface unit 112.

An operation unit 130 is a part through which a user or another person makes a request to the encoded-video reproduction device 100. In other words, a user or another person instructs the encoded-video reproduction device 100 by using the operation unit 130.

In general, the operation unit 130 is an operation panel or a remote controller. The operation panel is arranged, for example, on the front panel of the encoded-video reproduction device 100.

The system control unit 101 interprets the content of the instruction requested via the operation unit 130. Then, the system control unit 101 controls the decoder block 115 according to the requested instruction. And then, the system control unit 101 reproduces the stream information $D_{S2}$ according to the requested instruction. In other words, according to the requested instruction, the system control unit 101 sends a command to the decoder block 115 to reproduce the stream information $D_{S2}$.

Also, commands such as starting reproduction, stopping reproduction, pausing, fast-forwarding, rewinding, slow reproduction, and skipping are made via the operation unit 130.

If the normal reproduction speed is defined as a one-fold speed, reproduction at a faster speed than the one-fold speed or reproduction at a slower speed than the one-fold speed are called "special reproduction". Namely, reproduction at a speed other than the one-fold speed is called "special reproduction". The normal reproduction speed is a reproduction speed at which the video is to be reproduced. The normal reproduction speed is a reproduction speed recorded in the video information. The normal reproduction speed is a reproduction speed recorded in the stream information $D_{S1}$ of the video. The normal reproduction speed is a reproduction speed at which the video is to be reproduced when, in reproducing the video, no commands about the reproduction speed are received. The normal reproduction speed is a reproduction speed at which the video is to be reproduced when, in reproducing the video, no commands to change the reproduction speed are received. The normal reproduction speed is a reproduction speed at which the video is to be reproduced when, in reproducing the video, no commands to adjust the reproduction speed are received. "Normal reproduction speed", here, means a reproduction speed at a normal speed.

The tonemap generation unit 152 generates an expanded tonemap. The expanded tonemap is the information showing a correspondence relation between brightness setting values and respective output brightness levels.

A "brightness setting value" indicates brightness information recorded for each pixel in decoded video signals. An "output brightness level" indicates brightness of video to be displayed according to each brightness setting value.

For example, in a case of traditional SDR video, a brightness value of 255 corresponds to an output brightness level of 100 nits. In contrast to this, in a case of HDR video, a brightness value of 255 corresponds to an output brightness level of 10000 nits. Note here that this explanation assumes that there are 256 gradations (2 to the 8th power) in brightness resolution. "Nit" is a unit of brightness. To be more specific, nit is a unit (candela per square meter) which indicates how much light (light intensity) is emitted per solid angle from an apparent unit area.

Tonemap information of HDR video defined by the HDR video standard is recorded in the memory unit 120 as the standard HDR tonemap 140.

The memory unit 120 is, for example, a non-volatile memory.

Tonemap information of SDR video defined by the SDR video standard is recorded in the memory unit 120 as the standard SDR tonemap 141.

In Embodiment 1, for example, the display device information acquisition unit 151 and the tonemap generation unit 152 are configured with firmware or the like in the system control unit 101.

The display device information acquisition unit 151 and the tonemap generation unit 152 may be configured outside the system control unit 101. The display device information acquisition unit 151 and the tonemap generation unit 152 may be configured with hardware.

The function of the brightness information adjustment unit 150 may be realized by the video/audio decoding unit 111 or the digital interface unit 112. In this case, the brightness information adjustment unit 150 may be omitted.

Figure 2:
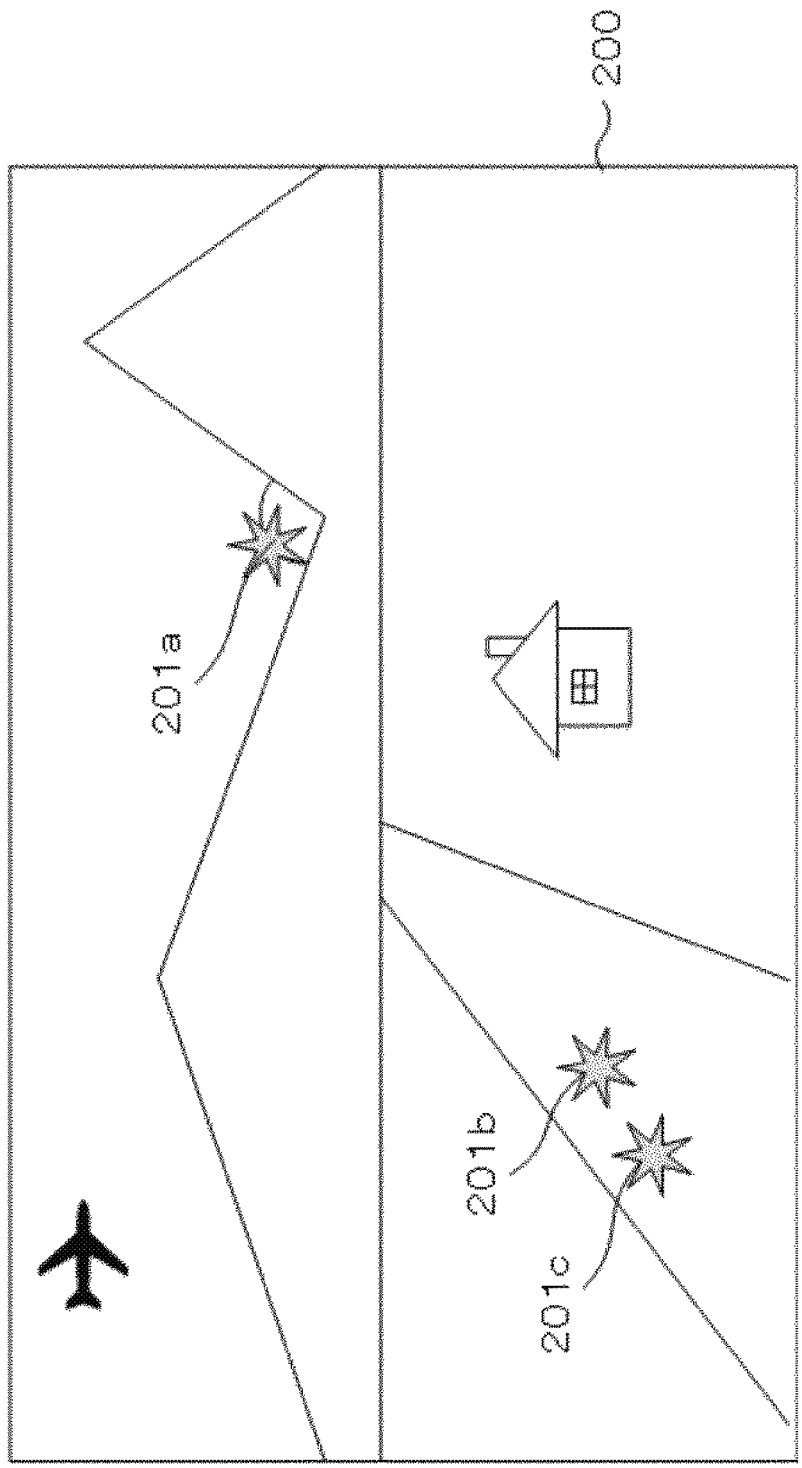
FIG. 2 is an explanatory picture about an image of an HDR video.

FIG. 2 is an explanatory picture about an image of an HDR video.

FIG. 2 shows an example of an HDR video image 200 displayed on the display device 113.

HDR is, as described above, an abbreviation of High Dynamic Range. HDR video has a wider range of displayable brightness signals from the minimum value to the maximum value than traditional SDR video.

Traditional SDR video has a limited displayable brightness range. For example, SDR video could not express high brightness such as brightness of the glitter of the sun and the reflection of light on a river.

Also, traditional SDR video could not express fine gradations in high brightness portions, where the image is saturated with the color of white to cause phenomena called "blown out highlights". For example, in FIG. 2, gradation expressions such as the glitter of the sun 201a, and glitter portions 201b and 201c produced by sunlight reflection on the river were damaged in SDR video. Also, SDR video could not display the high brightness portions themselves.

In the HDR video standard, an HDR video recorded on recording media is viewed using an HDR-video-compatible reproduction device and an HDR-video-compatible display device. The HDR-video-compatible reproduction device and the HDR-video-compatible display device make it possible to display the above-mentioned high brightness portions and express their gradation expressions, which allows users to enjoy viewing higher-quality videos.

Figure 3:
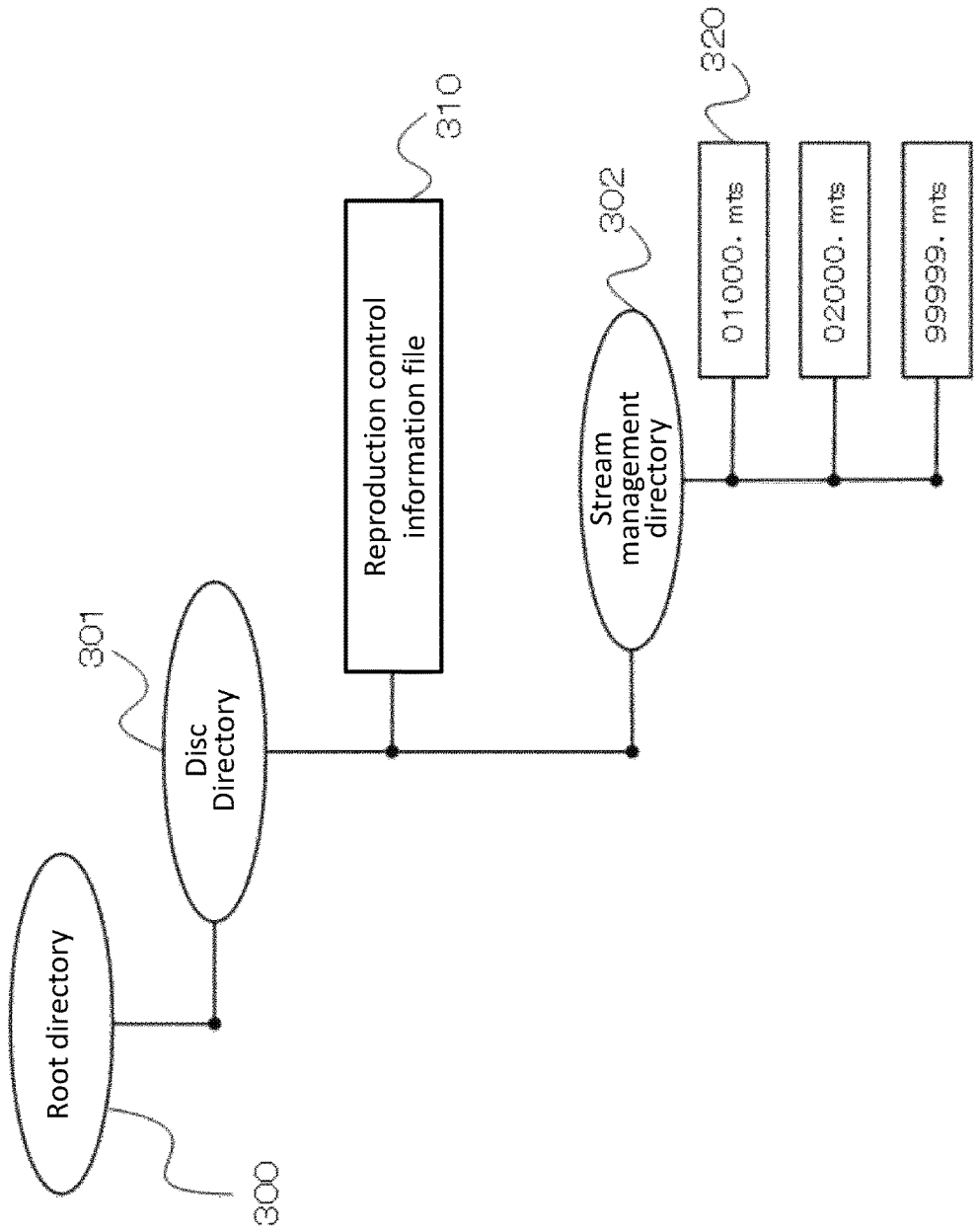
FIG. 3 is a diagram showing a logical file structure of an optical disc.

FIG. 3 is a diagram showing the logical file structure in the optical disc 103.

A root directory 300 is the top directory in a logical hierarchy structure. A disc directory 301 is a directory arranged in a lower layer of the root directory 300.

The disc directory 301 includes a reproduction control information file 310 and a stream management directory 302.

Reproduction control information $D_C$ is recoded in a file form in the reproduction control information file 310. The reproduction control information $D_c$ is information for managing disc contents recorded in the optical disc 103.

The stream management directory 302 is a folder for collectively recording stream information files 320. The stream information files 320 are examples of the stream information $D_{S2}$.

In FIG. 3, explanation will be made under an assumption that each stream information file 320 is stored with a five-digit file name. The file name only needs to be a five-digit number, which does not need to be a sequential number.

In the example, the stream information files 320 are put in a specific directory. The stream information files 320 may be directly put in the root directory 300. The stream information files 320 may be put in another directory position.

In the example, the stream information files 320 are formed as files separated according to certain management units. The stream information files 320, however, may be formed as a single file.

Figure 4:
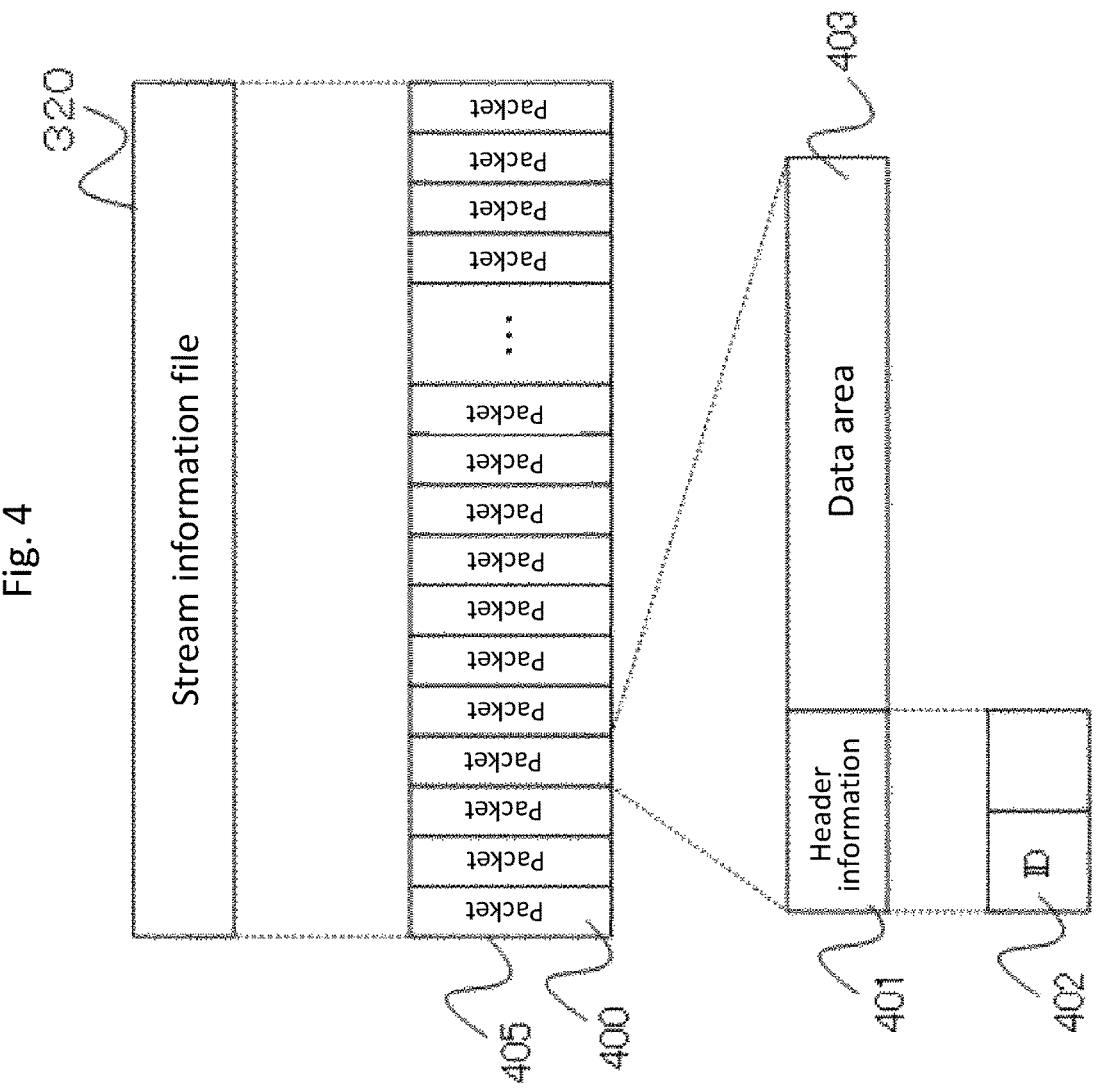
FIG. 4 is an explanatory diagram of an internal data structure of a stream information file.

FIG. 4 is an explanatory diagram showing an internal data structure of each stream information file 320.

The stream information file 320 includes multiple packets 400. The packets 400 are each configured with a fixed-length data unit. A packet layer 405 includes the multiple packets 400.

Data such as the video data, the audio data, and the stream management data is divided into the units of the packets 400. These data are multiplexed. The stream information file 320 includes these multiplexed data.

The stream information file 320 corresponds to the stream information $D_{S2}$. The stream management data is attribute information of the stream information file 320. In the stream management data, information about the video such as the codec, the resolution, the frame rate, and the access point is recorded. In the stream information $D_{S2}$, data such as the video data, the audio data, and the stream management data is included.

Each of the packets 400 includes header information 401 and a data area 403.

At the head of each packet 400, there is the header information 401. An ID 402 (Identification) written in the header information 401 is used for identifying data in the packets 400.

The stream control unit 110 uses the ID 402 to separate the stream information file 320 into the video data, the audio data, the stream management data, and the like.

FIG. 5 is an explanatory description of the syntax of the reproduction control information file 310.

The general information of the optical disc 103 shows information to identify the optical disc 103. In the general information of the optical disc 103, Studio_ID 501 and Disc_ID 502 are recorded. Studio_ID 501 is the identification number of the manufacturer of the optical disc 103. Disc_ID 502 is the identification number of the content in the optical disc 103.

Therefore, the content recorded in the optical disc 103 can be identified out of the entire discs put in the market by using the combination of Studio_ID 501 and Disc_ID 502.

Also, by using Studio_ID 501 and Disc_ID 502, metadata which relates to a specific content can be identified from the network. For example, the general information of the optical disc 103 can be used in order to obtain the output-brightness-level information on respective video scenes from the network. The "video scene" is a bundle of multiple continuous images in a scene. Therefore, in a single video scene, the correlation between the images becomes high.

A list of program titles recorded in the optical disc 103 is called a playlist. "Num_of_playlist 503" which indicates the total number of the playlists is recorded. In the loop statement following the next "for", a processing is repeated by the number indicated by "num_of_playlist 503".

The playlist includes one or more play items, which will be described later. A play item includes multiple video frames, each of which includes multiple pixels.

A "pixel" is the minimum unit (the minimum element) having color information (color tone or tone) for a computer to treat an image. The pixel is also called a picture element.

Information of "flag_HDR 504" is for identifying whether the playlist is HDR video or SDR video. In the case when multiple HDR video techniques are used, each of the multiple HDR video techniques may be specified by recording information indicating the type of the HDR video technique in the flag_HDR504.

"Max_LL 505" indicates the maximum output brightness level in the pixels of the playlist. "Max_Ave_LL 506" indicates an output brightness level of the video frames, which is the maximum average brightness among brightness averages calculated from respective video frames composing the playlist. "MasterMonitorInfo 507" indicates the display performance information of the mastering monitor used when the playlist is created. In other words, "MasterMonitorInfo 507" indicates the display performance information of the display device used when the playlist is created.

The playlist includes multiple play items. The total number of the play items is recorded as "num_of_playitem 508". In the loop statement following the next "for", a processing is repeated by the number indicated by "num_of_playitem 508".

In a play item, information about a single reproduction period is recorded. The play item includes a stream file name 509, a reproduction start time 510, and a reproduction end time 511 with respect to a reproduction object. According to the reproduction period information, the encoded-video reproduction device 100 can determine which period should be reproduced in the stream information file 320.

Also, in the reproduction control information file 310, "num_of_stream 512" which indicates the total number of the stream information files 320 recorded in the optical disc 103 is recorded. In the loop statement following the next "for", a processing is repeated by the number indicated by "num_of_stream 512".

A stream information file name 513 is numeric information of a five-digit number which indicates the name of the stream information file 320. In an attribute information management table 514, attribute information such as video information, and/or audio information used in the stream information file 320 is recorded. Also, in the attribute information management table 514, IDs 402 to identify packets and other information are stored with respect to each of video information and audio information which compose the stream.

By using the packet IDs, the stream control unit 110 separates video data, audio data, the stream management data, and the like. Data such as the video data, the audio data, and the stream management data is included in the stream information $D_{S2}$.

An access point management table 515 is an information list in which a stream readout position and the reproduction start time are recorded for each access point. By using the information list, random access reproduction such as time search and special reproduction can be performed.

For example, in a case where the video data is encoded as a MPEG2 video stream, the beginnings of GOPs (Group Of Picture) corresponds to the access points. For each of GOPs, the reproduction start time information and the reproduction start address information are written. The reproduction start address is a position with the beginning of the stream file taken as the starting point. In other words, the reproduction start address is counted from the beginning of the stream file taken as the reference point.

The encoded-video reproduction device 100 determines the reproduction start address of the stream information file 320 from the reproduction start time information, thereby performing random access reproduction.

Figure 6:
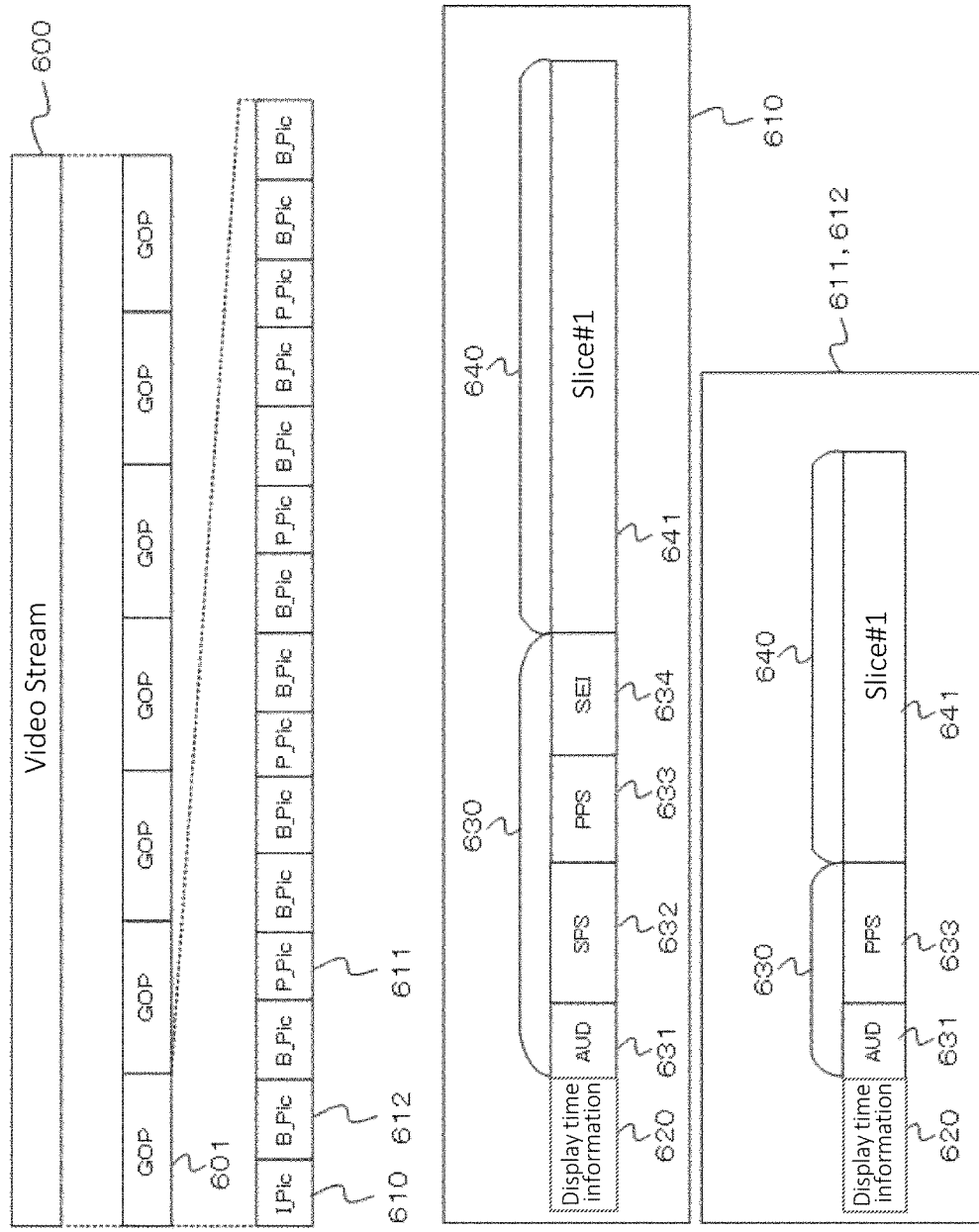
FIG. 6 is an explanatory diagram of a data structure of a video stream.

FIG. 6 is an explanatory diagram showing the data structure of a video stream. FIG. 6 shows the data structure of a video stream 600. The video stream 600 is an example of the stream information $D_{S2}$.

The stream information file 320 is demultiplexed in the stream control unit 110, so that the video stream 600 is extracted and is encoded and compressed. In the video stream 600, GOPs (Group Of Picture) 601 are information-compressed one by one, each of which is a unit for encoding and compressing.

Each GOP 601 includes an I-picture 610, P-pictures 611, and B-pictures 612.

The I-picture 610 is data-compressed in a frame. Each P-picture 611 is compressed data motion-compensated by the I-picture preceding in time. Each B-picture 612 is compressed data motion-compensated by the I-picture 610 or a P-picture 611 preceding or succeeding in time.

The encoding and compressing is performed, for example, in every half second of the reproduction time.

The I-picture 610 is positioned at the beginning of GOP 601. The I-picture 610 is decoded first in GOP 601. The I-picture 610 includes display time information 620, video attribute information 630 and encoded-video data 640.

The display time information 620 is provided with PTS (Presentation Time Stamp). Time information to be presented to the display device 113 is recorded in the display time information 620.

The display time information 620 only needs to be time information based on which the video and the audio can be synchronized. For the display time information 620, time information such as determined by NTP (Network Time Protocol) can be used instead of PTS.

The video attribute information 630 includes AUD 631, SPS 632, PPS 633, or SEI 634.

AUD 631 is an abbreviation of Access Unit Delimiter. AUD 631 has identifier information showing the beginning of an access unit of the video. Also, AUD 631 includes information showing the type of a slice included in the access unit of the video.

SPS 632 is an abbreviation of System Parameter Set. SPS 632 includes information such as a profile, a level, a resolution, and the upper limit value of frame rate or bit rate which relate to the encoding of the entire GOP 601.

PPS 633 is an abbreviation of Picture Parameter Set. PPS 633 includes information which relates to the encoding of the entire picture. PPS 633 also includes information such as an entropy encoding mode, and a quantization parameter for each picture.

SEI 634 is an abbreviation of Supplemental Element Information. In SEI 634, metadata information of GOP 601 is recorded. The metadata information includes information such as the maximum output brightness level of GOP 601 and the tonemap information of each GOP. Therefore, on the basis of the metadata information, the display device 113 can dynamically change the output brightness level of HDR video.

As shown in FIG. 6, the P-picture 611 and the B-picture 612, other than the I-picture 610, do not include SPS 632 and SEI 634.

Figure 7:
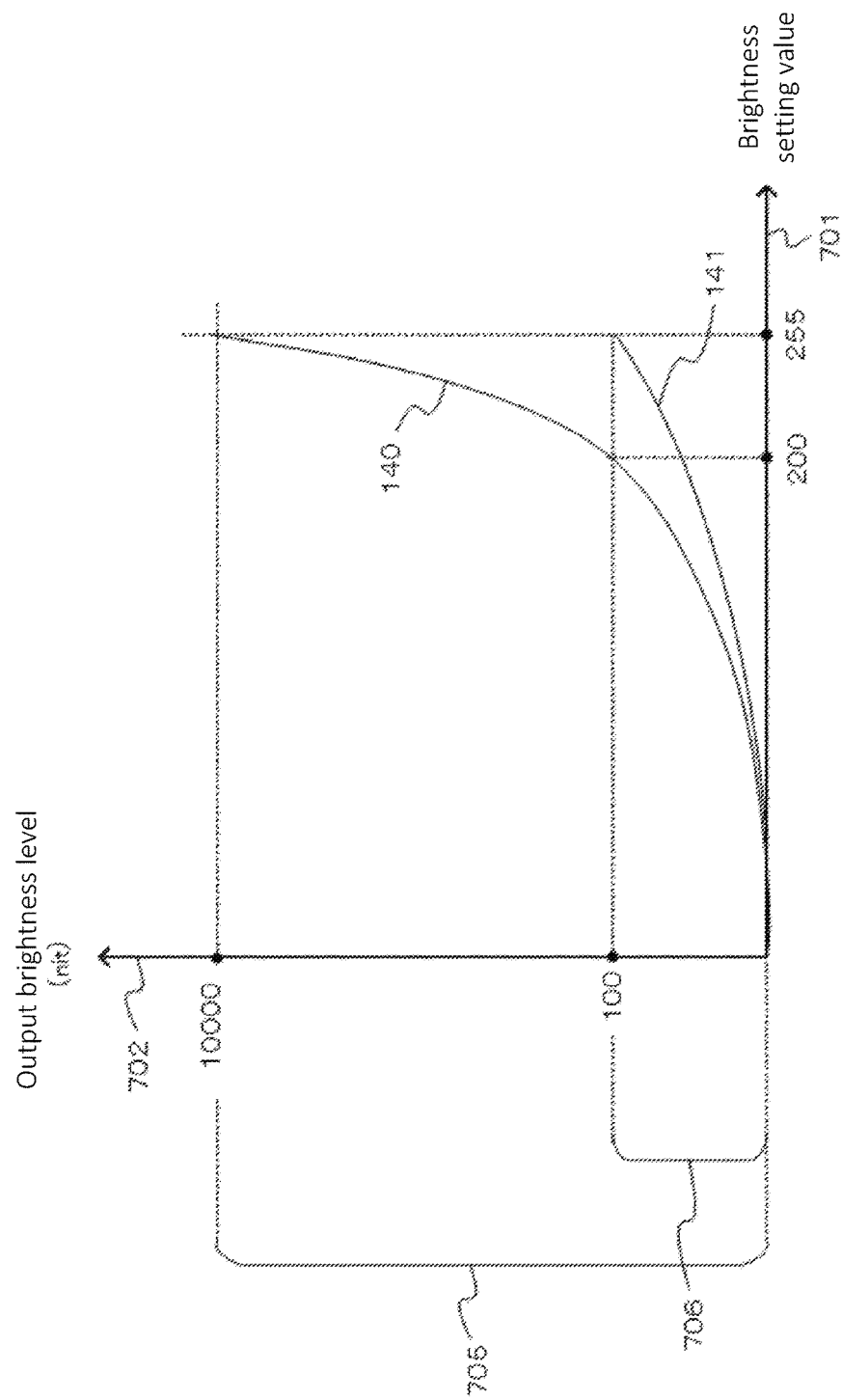
FIG. 7 shows a graph for explaining correlations between brightness setting values and output brightness levels.

FIG. 7 is an explanatory diagram showing a tonemap expressing a correlation between brightness setting values and output brightness levels [nit].

In FIG. 7, the horizontal axis indicates brightness setting values 701 and the vertical axis indicates output brightness levels 702.

A brightness setting value 701 is the brightness value of each of pixels composing a video frame obtained when the encoded-video is decoded. The brightness setting value 701 for a general video signal is represented by eight bits. Therefore, the brightness setting value 701 has a resolution of 256 (2 to the 8th power) gradations.

The general SDR video signal is standardized on the premise that brightness up to about 100 nits can be expressed as the output brightness level 702. To be more specific, the display brightness range 706 of SDR video covers, for example, from 0 (zero) nits to 100 nits.

In the general SDR video signal, the brightness setting value 701 takes a value ranging from 0 (zero) to 255. The output brightness level 702 takes a value ranging from 0 (zero) to 100.

The output brightness level 702 of 0 (zero) indicates the minimum brightness. The output brightness level 702 of 100 indicates the maximum brightness. This correspondence relation is called a standard SDR tonemap 141.

On the other hand, the general HDR video signal is standardized on the premise that brightness up to about 10000 nits can be expressed as the output brightness level 702. To be more specific, the display brightness range 705 of HDR video covers, for example, from 0 (zero) nits to 10000 nits.

In the general HDR video signal, the brightness setting value 701 takes a value ranging from 0 to 255. On the other hand, the output brightness level 702 takes a value ranging from 0 to 10000.

The output brightness level 702 of 0 (zero) indicates the minimum brightness. The output brightness level 702 of 10000 indicates the maximum brightness. This correspondence relation is called a standard HDR tonemap 140.

When compared with SDR video, HDR video can have a wider dynamic range for the output brightness level 702.

Furthermore, the output brightness level 702 of HDR video can be set very high. As the result, HDR video can realize very high brightness expression which the general SDR video cannot. HDR video can express, for example, the shining of the sun.

Also, HDR video can express tones of high brightness portions. HDR video, therefore, can display high quality video images.

When a video is mastered as HDR video, brightness setting values 701 are recorded in the optical disc 103 on the premise that the standard HDR tonemap 140 is to be used. When a video is mastered as SDR video, brightness setting values 701 are recorded in the optical disc 103 on the premise that the standard SDR tonemap 141 is to be used.

In Embodiment 1, the brightness setting values 701 have been explained under an assumption that each of them is expressed in eight bits. The brightness setting values 701 may, however, have ten- or twelve-bit resolution.

The brightness setting values 701 are expressed as values on a conversion curve which is specified by a standard. The conversion curve is, for example, the standard SDR tonemap 141 or the standard HDR tonemap 140. The brightness setting values 701 may also be expressed as values on a linear function. The brightness setting values 701 may be expressed as values on a conversion curve whose inclination is varied.

FIG. 8 shows a graph for explaining generation of an expanded tonemap according to Embodiment 1. FIG. 8 is a diagram showing an example of an expanded tonemap 810 to be used for special reproduction of HDR video. A typical example of the special reproduction is fast-forward reproduction or rewind reproduction.

In the fast-forward reproduction, video images of low-correlation scenes are successively displayed at a high speed. Therefore, it is highly likely that bright spots of HDR video move furiously on the screen, namely it is highly likely that bright spots of HDR video move furiously in fast-forwarded video images. This phenomenon causes problems such as viewer's eye-fatigue.

In Embodiment 1, if the value of the output brightness level 702 is within the range up to N_LL 801, the expanded tonemap 810 shows the same correlation as the standard HDR tonemap 140. If the value of the output brightness level 702 exceeds N_LL 801, the expanded tonemap 810 is clipped at the output brightness level 702 of N_LL 801. "N_LL 801" indicates a specific output brightness level 702.

To help understanding, for example, let the value of any output brightness level 702 exceeding N_LL 801 be a first output brightness level. Then, let N_LL 801 be the value of a second output brightness level 702. In this case, the brightness information adjustment unit 150 changes the first output brightness level of the expanded video data to the second output brightness level.

In FIG. 8, N_LL 801 is a value between 100 nits and 10000 nits. N_LL 801 may take a value of 100 nits.

Note that the brightness setting value 701 in the case where the output brightness level 702 takes N_LL 801 is defined as "N_Value 802".

That is, at the special reproduction, brightness exceeding a specific value of the output brightness level 702 is confined to be displayed on the screen. As the result, the bright spots can be prevented from furiously moving on the screen, which leads to reduction of the viewer's eye fatigue.

Note that in the case where the output brightness level is equal to or less than N_LL 801, the correlation indicated by the expanded tonemap 810 is the same as the correlation indicated by the standard HDR tonemap 140.

Therefore, when the normal reproduction is switched to the special reproduction, the effect to the entire screen brightness except for the bright spots, or the effect to the gradation expression can be controlled to the lowest level. The expanded tonemap 810, however, only requires the output brightness level 702 to be equal to or less than N_LL 801, and does not need to take the shape of the graph shown in FIG. 8.

N_LL 801 may be set to any fixed value within the range from 0 (zero) nits to 10000 nits. 10000 nits is the maximum output brightness level of HDR video.

The range may be dynamically varied in accordance with video scenes, operation types, the performances of the reproduction device, and the conditions of viewing, etc. To be more specific, the range between 0 (zero) nits and N_LL 801 may be dynamically varied. In the case where the range is dynamically varied, the variation factors include a special reproduction speed, the number of frames to be displayed per unit time in special reproduction, a skip interval of random reproduction, the operator's age and sex, and the information on the colors to be displayed.

In the case where the special reproduction speed is taken as the variation factor, as the faster reproduction speed, the smaller value is set on N_LL 801. The special reproduction speed is, for example, the speed for the fast-forward or the rewind.

To help understanding, for example, let the normal reproduction speed be a first reproduction speed. Let the fast-forward reproduction speed be a second reproduction speed. Let N_LL 801 at the normal reproduction speed be a first brightness level. Let N_LL 801 at the fast-forward reproduction speed be a second brightness level. In this case, when reproducing the expanded video data at the second reproduction speed which is faster than the first reproduction speed being the normal speed, the brightness information adjustment unit 150 reduces the first output brightness level down to the second output brightness level.

As for another example, let a third reproduction speed and a fourth reproduction speed be faster than the first reproduction speed (the normal reproduction speed). Also, let the third reproduction speed be faster than the fourth reproduction speed. The third reproduction speed is, for example, a double speed. The fourth reproduction speed is, for example, one and a half fold speed. Also, let the first output brightness level be, for example, a value of the output brightness level 702 exceeding N_LL 801 in FIG. 8.

In this case, the brightness information adjustment unit 150 reduces the first output brightness level for reproducing at the third reproduction speed (double speed), more than the first output brightness level in reproducing at the fourth reproduction speed (one and a half fold speed).

In FIG. 8, N_LL 801 is assumed to be between 100 nits and 10000 nits, which though may be 100 nits.

In successive video images, the slower the reproduction speed is, the higher the correlation between video images will be. It is hard for the positions of bright spots to move on the screen, namely it is hard for the positions of the bright spots to move in the video images.

For example, in reproducing at one and a half fold speed, the bright spots move almost at the same speed as the normal reproduction speed. Therefore, in the fast-forward reproduction at one and a half fold speed, it is unlikely that the bright spots move furiously on the screen (in the video images).

On the other hand, in reproducing at a fifty fold speed, the correlation between video images becomes low. Therefore, it is highly likely that the bright spots move furiously on the screen (in the video images).

The higher the fast-forward speed rate is, the more eye-fatigue develops due to the movement of the bright spots of HDR video. Therefore, N_LL 801 is set to a small value so that the brightness of the bright spots is limited for easing the viewer's eye fatigue.

In the case where the number of frames to be displayed per unit time in special reproduction is taken as the variation factor, the larger the number of frames to be displayed is, the smaller value set on N_LL 801.

In the special reproduction, intermittently selected I-pictures are displayed as successive video frames.

Note that the number of I-pictures displayable per unit time varies depending on CPU performance of the encoded-video reproduction device 100 or the display resolution.

When a large number of the pictures are displayed, bright spots are highly likely to move fiercely on the screen (in the video images). The more the number of frames displayed per unit time is, the more severe eye-fatigue becomes due to the movement of the bright spots of HDR video. Therefore, N_LL 801 is set to a low value, so that the brightness of the bright spots will be limited to ease the viewer's eye-fatigue.

In the case where the skip interval of the random reproduction is taken as the variation factor, the longer the skip interval is, the smaller value is set on N_LL 801. The "skip interval" is a jump interval in reproducing time. The skip interval is, for example, a five-second skip, a fifteen-second skip, a thirty-second skip, or a chapter skip.

The longer the jump interval is, the less the correlation between video images before and after skip is. In other words, the video scenes are often different between before and after skip. Therefore, the entire screen is highly likely to largely change its brightness.

For example, when a dark video image switches to a highly bright video image, there arises a problem that a viewer is dazzled. "Dazzlement" means temporal loss of eyesight due to intense light, etc.

This problem can be mitigated by lowering N_LL 801 for predetermined time from right after the skip operation. In other words, this problem can be mitigated by temporarily lowering N_LL 801 after the skip operation.

In general, the dazzle leads to a state of temporary blindness. It is said that it takes three to ten seconds to recover normal eyesight from dazzlement. The recovery time depends on ages. The elderly people are said to easily fall into the state of dazzlement.

For example, N_LL 801 is lowered for three seconds after a skip operation. This prevents the video image after the skip operation from suddenly becoming bright. After three seconds have elapsed, the brightness is gradually increased in order that the viewer's eye will be adapted to the brightness. With such processing, the viewer's dazzlement can be mitigated.

After this processing, N_LL 801 is increased step by step, so that the viewer's eye-fatigue can be reduced.

In the case where the operator's age or sex is taken as the variation factor, a smaller value is set on N_LL 801 when the operator is young or female. In general, the young (children) and the female easily develop a photosensitive seizure. In other words, the young and the female have a tendency to be sensitive to intense flashing light. Therefore, the value of N_LL 801 may be changed depending on the operator.

In the case where information on colors to be displayed is taken as the variation factor, when it is determined that the color information of the bright spot is a reddish color, a small value is set on N_LL 801.

The flash or cut-change of a bright red color is likely to cause a photosensitive seizure. Therefore, the value of N_LL 801 may be changed considering the display color information in addition to the brightness information.

N_LL 801 may be changed by obtaining the display performance information about the connected display device 113 to take the display's screen size, the maximum output brightness level, the recommended maximum brightness level, or the like obtained from the display performance as the variation factor. The "recommended maximum brightness level" indicates the most energy-efficient maximum brightness setting value for the display device.

In the case where the display's screen size is taken as the variation factor, the larger the display's screen size is, the smaller value is set on N_LL 801. This is because when the display's screen size is large, the distances over which the bright spots move become large, easily causing eye-fatigue.

In the case where the maximum output brightness level is taken as the variation factor, a maximum output brightness level obtained from the display device 113 is set on N_LL 801, so that the entire range of the brightness setting value 701 can be used.

To be more specific, a second expanded tonemap is formed as a curve 811 shown in FIG. 8. The second expanded tonemap 811 shows that the output brightness level 702 is N_LL 801 when the brightness setting value 701 is 255. By this formation, brightness gradations for displaying video images can be set more finely within the displayable range of the display device 113 up to the maximum brightness. Thus, the display device 113 can display higher-quality video images.

Also in this case, the brightness information adjustment unit 150 changes the first output brightness level of the expanded video data to the second output brightness level. The first output brightness level corresponds to the output brightness level of the standard HDR tonemap 140. The second output brightness level corresponds to the output brightness level of the second expanded tonemap 811.

The curve 811 can be obtained, for example, by multiplying the value of the output brightness level of each brightness setting value 701 by N_LL 801 divided by 10000. In other words, the curve can be obtained by multiplying the value of the output brightness level of each brightness setting value 701 by the ratio of N_LL 801 to 10000.

In the case where the recommended maximum brightness level is taken as the variation factor, a recommended maximum brightness level obtained from the display device 113 is set on N_LL 801, so that the entire range of the brightness setting value 701 can be used.

To be more specific, by adjusting the second expanded tonemap to the curve 811, the encoded-video reproduction device 100 can perform brightness value conversion in which the energy-saving performance of the display device 113 is taken into account. In the second expanded tonemap 811, the output brightness level 702 is N_LL 801 when the brightness setting value 701 is 255.

As described in the cases above, the expanded tonemap may be generated from a single variation factor. The expanded tonemap may be generated from a combination of multiple variation factors.

In Embodiment 1, an example has been described in which the tonemap generation unit 152 generates the expanded tonemap. Multiple expanded tonemaps may be stored in advance in the memory unit 120 so that the most similar expanded tonemap will be selected according to the result of the variation factor(s).

In this case, the tonemap generation unit 152 is unnecessary. The brightness information adjustment unit 150 adjusts brightness using the stored expanded tonemap. The actual component of the expanded tonemap may be a correspondence table, a function, or a conditional statement each indicating output brightness levels from respective brightness setting values, and it suffices that when given a brightness setting value, the actual component provides the information uniquely determining a output brightness level.

As shown in FIG. 8, the standard HDR tonemap 140 is changed to the expanded tonemap 810 or the second expanded tonemap 811 within the range of the brightness setting value. The standard HDR tonemap 140 is changed to the expanded tonemap 810 or the second expanded tonemap 811 so as to cover the entire range of the brightness setting value. To be more specific, the brightness information adjustment unit 150 changes output brightness levels of the expanded video data (the video information $D_{V1}$) to output brightness levels of the video information $D_{V2}$ within the range of the brightness setting value. In the embodiment, the brightness information adjustment unit 150 changes output brightness levels of the expanded video data (the video information $D_{V1}$) to output brightness levels of the video information $D_{V2}$ within the entire range of the brightness setting value.

FIG. 9 is an explanatory table describing the system's actions in every combination between the recording media being the optical disc 103, and the display device 113 each of which is compatible with HDR video or SDR video.

Combinations of HDR compatibility and HDR incompatibility with respect to the recording media and the display device include four patterns: a combination (SDR_SDR) 901, a combination (SDR_HDR) 902, a combination (HDR_SDR) 903, and a combination (HDR_HDR) 904.

The combination (SDR_SDR) 901 is a combination example in which both of the recording media (the optical disc 103) and the display device 113 are compatible with conventional SDR video.

In the combination (SDR_SDR) 901, brightness in the decoded video signals $D_{V1}$ decoded by the video/audio decoding unit 111 is not adjusted by the brightness information adjustment unit 150. The decoded video signals $D_{V1}$ are transmitted intact, as SDR video signals, through the digital interface unit 112 to the display device 113. The display device 113 keeps intact and displays the video signals $D_{V1}$ as SDR video.

In the combination (SDR_HDR) 902, the recording media (the optical disc 103) is for SDR video and the display device 113 is an HDR-video-compatible device.

In the combination (SDR_HDR) 902, brightness in the decoded video signals $D_{V1}$ decoded by the video/audio decoding unit 111 is not adjusted by the brightness information adjustment unit 150. The decoded video signals $D_{V1}$ are transmitted intact, as SDR video signals, through the digital interface unit 112 to the display device 113. The display device 113 changes output brightness levels according to an internally stored standard HDR tonemap 720, and then displays the video signals $D_{V1}$ as HDR video.

In the combination (HDR_SDR) 903, the recording media (the optical disc 103) is for HDR video and the display device 113 is an SDR-video-compatible device.

In the combination (HDR_SDR) 903, from the video signals $D_{V1}$ decoded by the video/audio decoding unit 111, output brightness levels of brightness setting values 701 are calculated using the standard HDR tonemap 140 stored in the memory unit 120.

Then, the calculated output brightness levels 702 are converted to the corresponding brightness setting values 701 in the standard SDR tonemap 141. The video signals $D_{V3}$ converted to the corresponding brightness setting value 701 are transmitted, as SDR video signals, to the display device 113 via the digital interface unit 112. The display device 113 keeps intact and displays the video signals $D_{V3}$ as SDR video.

In the combination (HDR_HDR) 904, both of the recording media (the optical disc 103) and the display device 113 are compatible with HDR video.

When normal reproduction is performed in the combination (HDR_HDR) 904, the brightness information adjustment unit 150 does not adjust brightness of the decoded video signals $D_{V1}$ decoded in the video and voice decoding unit 111. The decoded video signals $D_{V1}$ are transmitted intact, as HDR video signals, through the digital interface unit 112 to the display device 113. The display device 113 keeps intact and displays the video signals $D_{V1}$ as HDR video.

When performing special reproduction in Embodiment 1, the brightness information adjustment unit 150 uses the expanded tonemap 810 or 811 to convert the brightness setting values 701 of the video signals $D_{V1}$. The expanded tonemaps 810 and 811 are generated in the tonemap generation unit 152.

Then, the video signals $D_{V2}$ whose brightness setting values 701 are converted are transmitted, as HDR video signals, to the display device 113 via the digital interface unit 112. The display device 113 keeps intact and displays the video signals $D_{V2}$, as HDR video.

In FIG. 9, the distinction between HDR video and SDR video may be made for the entire recording media (the optical disc 103). Also, as explained in Embodiment 1, the distinction between HDR video and SDR video may be made per playlist or per stream information file.

Figure 10:
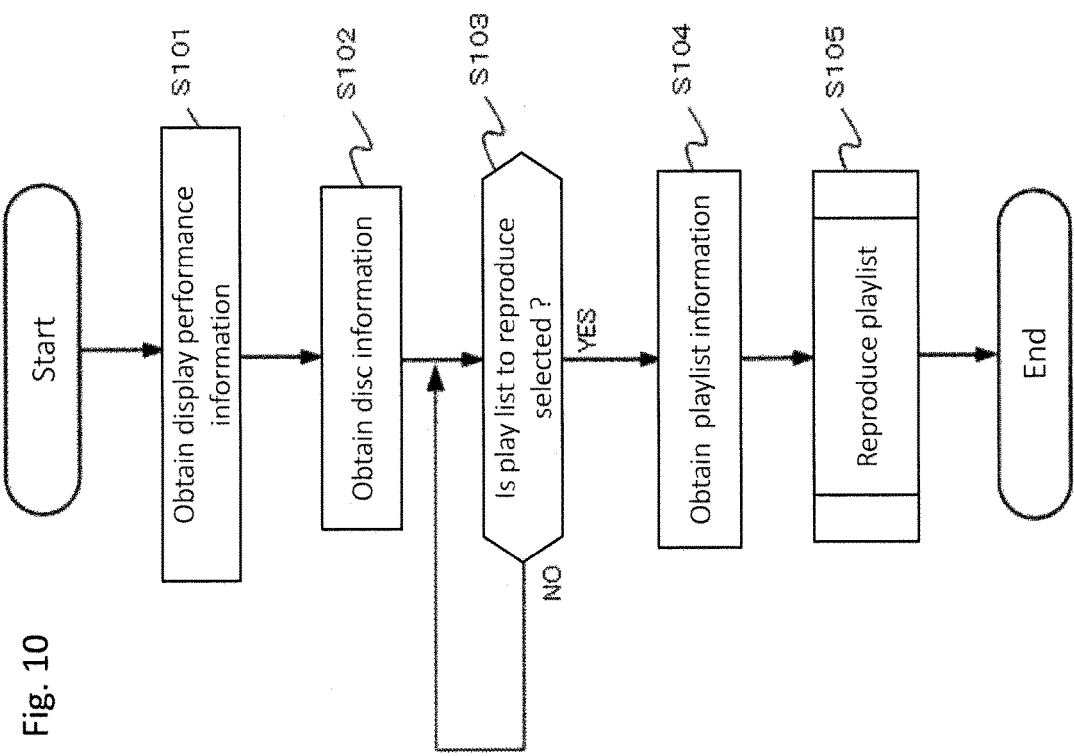
FIG. 10 is a basic flow chart of reproduction a process according to Embodiment 1.

FIG. 10 is a basic flow chart of the reproduction process in Embodiment 1.

First, the display device information acquisition unit 151 obtains the display performance of the connected display device 113 (S101).

Then, the system control unit 101 reads the reproduction control information (reproduction control information file) 310 from the optical disc 103 inserted in the reproduction drive unit 102 (S102) to obtain disc information. The disc information includes, for example, the stream information $D_{S1}$, and the reproduction control information $D_c$.

Then, a playlist that the viewer wants to reproduce is selected from the optical disc 103 (S103). When the playlist that the viewer wants to reproduce is selected, the process proceeds to "YES". When the playlist that the viewer wants to reproduce is not selected, the process proceeds to "NO".

The system control unit 101 reads out information about the selected playlist from the reproduction control information 310 (S104).

By using the information, it is determined whether the selected playlist is HDR video or not. Then, the stream information file 320 to be reproduced is determined by the playlist selected from the optical disc 103. The readout position of the stream information file 320 to be reproduced is obtained. By decoding the information (the stream information $D_{S2}$) from the readout position, the playlist is reproduced (S105).

Figure 11:
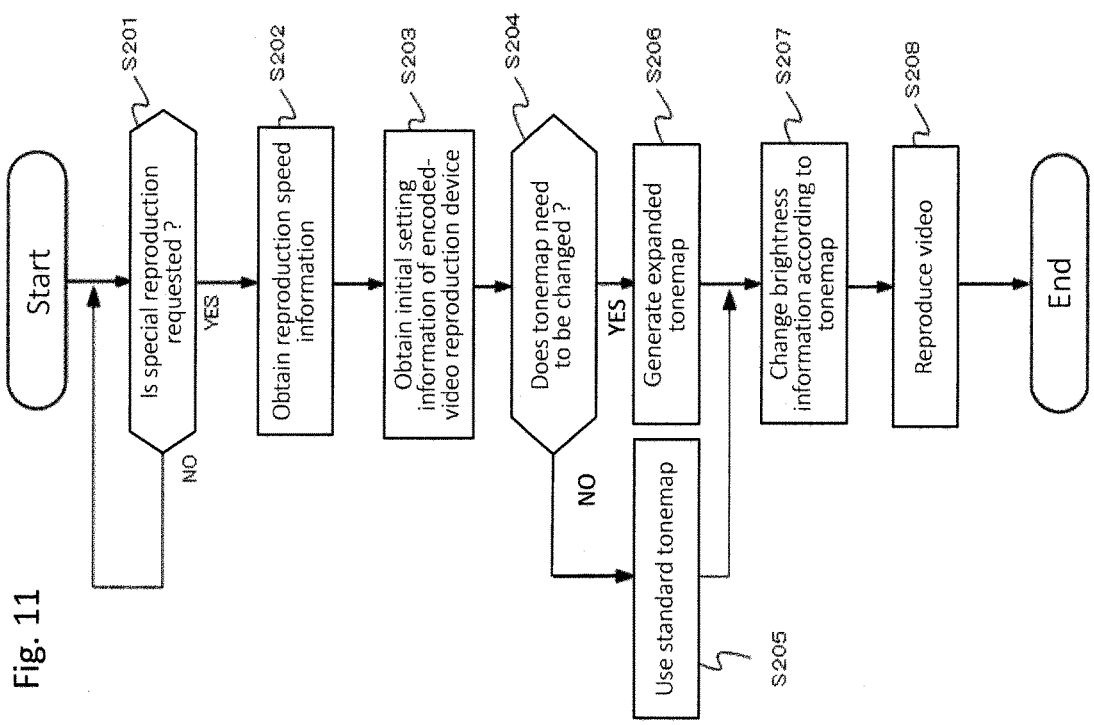
FIG. 11 is a flow chart showing a tonemap changing process according to Embodiment 1.

FIG. 11 is a flow chart of a tonemap changing process in Embodiment 1.

Note that this flow chart is based on the premise that the recorded content is HDR video to be outputted to an HDR-compatible display device 113.

During reproduction of a playlist, a command for special reproduction such as fast-forward reproduction or rewind reproduction is received via the operation unit 130 (S201). When receiving the command for the special reproduction, the processing proceeds to "YES". When not receiving the command for the special reproduction, the processing proceeds to "NO".

When it is determined that a command for the special reproduction is received, reproduction speed information of the command special reproduction is obtained (S202).

Note that the reproduction speed information is information indicating the multiplication factor of the reproduction speed compared with the normal reproduction speed. The reproduction speed information of a 0.5-fold speed indicates "slow reproduction" whose reproduction speed is half of the normal reproduction speed. The reproduction speed information of a three-fold speed indicates "fast-forward reproduction" whose reproduction speed is three times faster than the normal reproduction speed.

Then, initial setting information of the encoded-video reproduction device 100 is obtained (S203).

The "initial setting information" is setting information that devices individually have. The initial setting information includes initially-set information such as the operator's age and sex. Such information does not necessarily need to be set according to the initial setting information. For example, the operator's attribute information may be obtained from the operation unit 130.

Then, in the tonemap generation unit 152, it is determined whether a change to the expanded tonemap 810 or 811 is needed (S204). When the change to the expanded tonemap 810 or 811 is needed, "YES" is selected. When the change to the expanded tonemap 810 or 811 is not needed, "NO" is selected.

To be more specific, when fast-forward reproduction at a speed faster than a certain reproduction speed is commanded, an expanded tonemap 810 or 811 is generated according to the commanded reproduction speed (S206).

The certain reproduction speed, for example, is determined on the basis of the initial setting information. Also, the certain reproduction speed, for example, may be determined on the basis of the setting information inputted from the operation unit 130.

The brightness information adjustment unit 150 adjusts brightness of the video outputs (S207), using the expanded tonemap 810 or 811 generated in the step S206.

Then, the video signals $D_{V3}$ and the audio signals $D_{A2}$ are outputted from the digital interface unit 112 to the display device 113 (S208).

For example, in slow reproduction at a 0.5-fold speed, or in low speed fast-forward reproduction at a 1.3-fold speed, the correlation in successive video images is high. Therefore, the brightness adjustment by using the expanded tonemap 810 or 811 is not needed. This is the reason why the condition of "faster than a certain speed" is added.

The value of N_LL 801 may be further divided to adjust according to fast-forward speeds. Then, the processing proceeds to step S207.

In step S204, when it is determined that the tonemap does not need to be changed, the processing proceeds to step S205. To be more specific, when the tonemap does not need to be changed to the expanded tonemap 810 or 811, "NO" is selected. The standard HDR tonemap 140 or the standard SDR tonemap 141 stored in the memory unit 120 is selected, and the processing proceeds to step S207.

The brightness information adjustment unit 150 uses the standard tonemap 140 or 141 which is used in the step S205 to adjust brightness of the video output (the video information $D_{V1}$) (S207).

The processing of step S205 may be performed after step S203. To be more specific, it is allowed that after the standard HDR tonemap 140 or the standard SDR tonemap 141 stored in the memory unit 120 is selected, whether the tonemap needs to be changed to the expanded tonemap 810 or 811 is determined in step S204. When the tonemap does not need to be changed to the expanded tonemap 810 or 811, the processing proceeds to step S207.

In a case of the normal reproduction, it is possible to enjoy viewing high quality HDR video with the encoded-video reproduction device 100 according to Embodiment 1. In a case of the special reproduction, the encoded-video reproduction device 100 can reduce eye-fatigue caused by HDR video.

Another effect realized by Embodiment 1 is that, in HDR reproduction, the expanded tonemap 810 or 811 can be generated according to the display performance of the display device 113 (liquid crystal television). Therefore, it is possible to express fine gradations or perform energy-saving brightness adjustment, according to the display performance of the display device 113.

<Modification Example>

In the above embodiment, HDR video is recorded on the optical disc 103. A modification example is shown in which SDR video recorded on the optical disc 103 is converted to HDR video.

Figure 12:
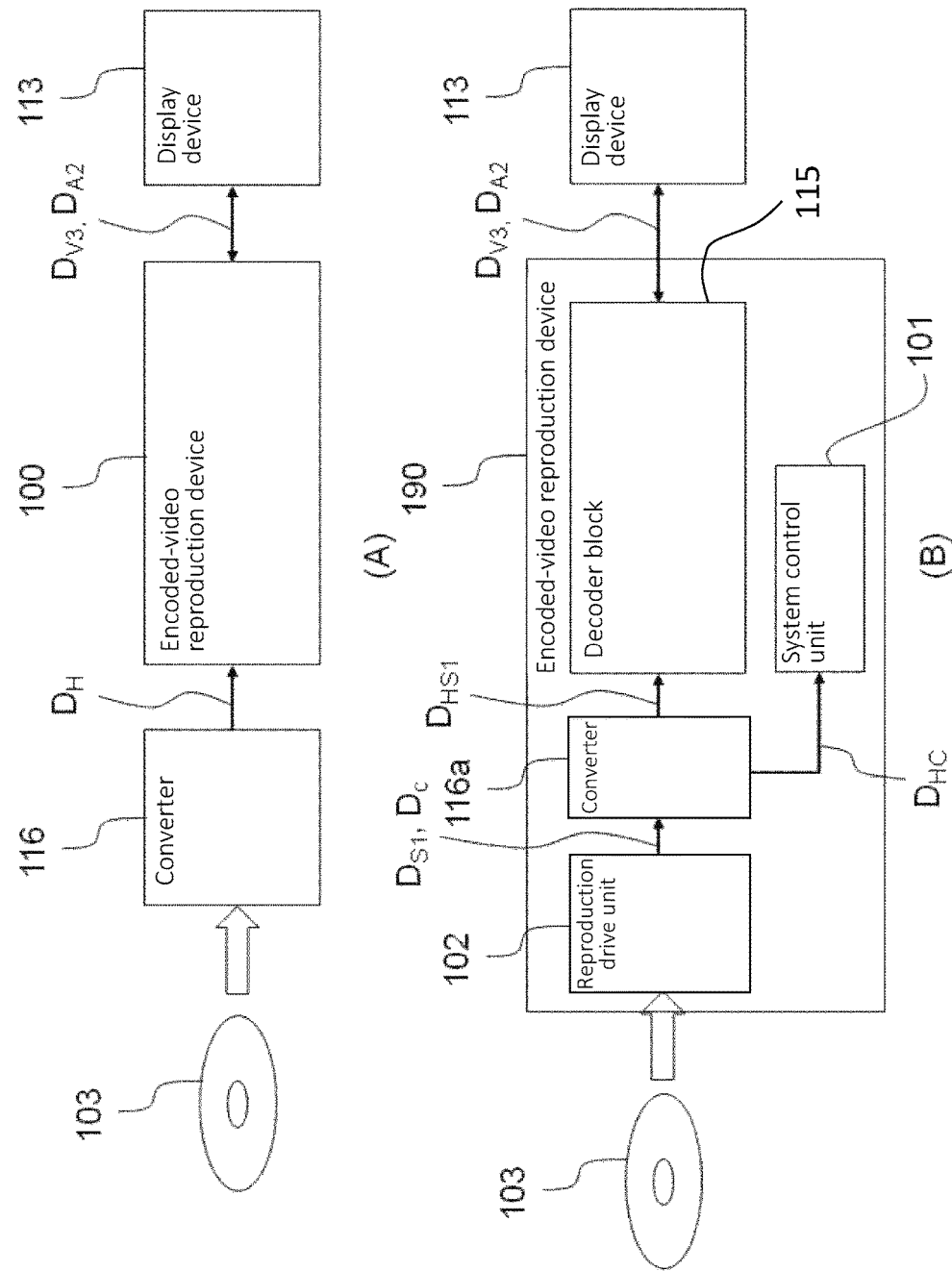
FIG. 12 are system configuration diagrams each showing a modified example of the encoded-video reproduction device.

FIG. 12 are system configuration diagrams each showing a modification example of the encoded-video reproduction device. An encoded-video reproduction device 100 shown in FIG. 12(A) does not include a converter 116. An encoded-video reproduction device 190 shown in FIG. 12(B) includes a conversion unit 116a.

A conversion unit 116a provided in the encoded-video reproduction device 190 is the same as the converter 116. Therefore, the conversion unit 116a has the same function as the converter 116. In the description below, the explanation about the converter 116 also serves as the explanation about the conversion unit 116a.

The converter 116 converts SDR video to HDR video. HDR video information $D_H$ to which the converter 116 converts is sent to the encoded-video reproduction device 100. The information $D_H$ includes stream information $D_{HS1}$ which is a conversion result of HDR video and reproduction control information $D_{HC}$ of the stream information $D_{HS1}$.

The converter 116 includes the function of the reproduction drive unit 102. On the other hand, the conversion unit 116a does not include the function of the reproduction drive unit 102.

Therefore, the conversion unit 116a receives information which is read out by the reproduction drive unit 102, the information which has been recorded in the optical disc 103. The information recorded in the optical disc 103 includes stream information $D_{S1}$ and reproduction control information $D_C$ of the stream information $D_{S1}$.

Then, the conversion unit 116a converts the received information to HDR-video-compatible information. The conversion unit 116a sends HDR-video-compatible stream information $D_{HS1}$ to the decoder block 115. Also, the conversion unit 116a sends the HDR-video-compatible reproduction control information $D_{HC}$ to a system control unit 101.

In the modification, the SDR video can be reproduced at the level of HDR video. In the case of fast-forward reproduction, the SDR video can be reproduced without conversion to HDR video. Alternatively, in the case of the fast-forward reproduction, after converting SDR video to HDR video, the processing as shown in Embodiment 1 can be performed.

<Supplementary Notes>

On the basis of the above embodiment, the following contents are added as the supplementary notes.

<Supplementary Note 1>

A video reproduction device which reproduces expanded video data whose brightness dynamic range is wider than that of standard video, including:

a brightness information adjustment unit to change brightness information of the expanded video data on a basis of a tonemap defining correspondence relation between brightness values and respective output brightness levels, wherein, when the expanded video data is reproduced at a reproduction speed faster than a normal reproduction speed, output brightness levels are reduced on a basis of the tonemap.

<Supplementary Note 2>

The video reproduction device according to Supplementary note 1, wherein, when the expanded video data is reproduced at a reproduction speed faster than the normal reproduction speed, the larger the number of frames to be displayed per unit time is, the more the output brightness levels are reduced on a basis of the tonemap.

<Supplementary Note 3>

The video reproduction device according to Supplementary note 1 or 2, wherein the tonemap is generated so that the maximum value of the output brightness levels becomes a predetermined level or lower.

<Supplementary Note 4>

A video reproduction method, including:

a step of reading expanded video data whose brightness dynamic range is wider than that of a standard video; and a step of changing brightness information of the expanded video data on a basis of a tonemap defining correspondence relation between brightness values and respective output brightness levels, wherein, when the expanded video data is reproduced at a reproduction speed faster than a normal reproduction speed, output brightness levels are reduced on a basis of the tonemap.

<Supplementary Note 5>

The video reproduction method according to Supplementary note 4, wherein, when the expanded video data is reproduced at a reproduction speed faster than the normal reproduction speed, the larger the number of frames to be displayed per unit time is, the more the output brightness levels are reduced on a basis of the tonemap.

<Supplementary Note 6>

The video reproduction method according to Supplementary note 4 or 5, wherein the tonemap is generated so that the maximum value of the output brightness levels becomes a predetermined level or lower.

The embodiment of the present invention has been explained as described above. The present invention, however, is not limited to the embodiment.

Description of Symbols

100: encoded-video reproduction device
101: system control unit
102: reproduction drive unit
103: optical disc
110: stream control unit
111: video/audio decoding unit
112: digital interface unit
113: display device
114: display device communication unit
115: decoder block
116: converter
116a: conversion unit
120: memory unit
130: operation unit
140: standard HDR tonemap
141: standard SDR tonemap
150: brightness information adjustment unit
151: display device information acquisition unit
152: tonemap generation unit
200: HDR video image
300: root directory
301: disc directory
302: stream management directory
310: reproduction control information file
320: stream information file
400: packet
401: header information
402: ID
403: data area
405: packet layer
501: Studio_ID
502: Disc_ID
503: num_of_playlist
504: flag_HDR
505: Max_LL
506: Max_Ave_LL
507: MasterMonitorInfo
508: num_of_playitem
509: stream file name
510: reproduction start time
511: reproduction end time
512: num_of_stream
513: stream information file name
514: attribute information management table
515: access point management table
600: video stream
601: GOP
610: I-picture
611: P-picture
612: B-picture
620: display time information
630: video attribute information
631: AUD
632: SPS
633: PPS
634: SEI
640: encoded-video data
641: slice
701: brightness setting value
702: output brightness level
705: display brightness range of HDR video 706: display brightness range of SDR video
801: N_LL
802: N_Value
810: expanded tonemap
811: second expanded tonemap
901: combination (SDR_SDR)
902: combination (SDR_HDR)
903: combination (HDR_SDR)
904: combination (HDR_HDR)
$D_C$, $D_{HC}$: reproduction control information
$D_D$: decoder control signal
$D_H$: information converted to HDR video
$D_{S1}$, $D_{S2}$, $D_{HS1}$: stream information
$D_T$: video attribute information
$D_F$: displayable format
$D_{V1}$, $D_{V2}$, $D_{V3}$: video signal
$D_{A1}$, $D_{A2}$: audio signal

The invention claimed is:

1. A video reproduction device to reproduce expanded video data whose brightness dynamic range is wider than that of a standard video, the device comprising:
a brightness information adjuster to change respective second output brightness levels by reducing first output brightness levels of the expanded video data,
wherein, when the expanded video data is reproduced at a second reproduction speed faster than a first reproduction speed which is a normal speed, the brightness information adjuster reduces the first output brightness levels to the second output brightness levels, and
wherein in a case where a third reproduction speed and a fourth reproduction speed included in the second reproduction speed are faster reproduction speeds than the first reproduction speed and the third reproduction speed is faster than the fourth reproduction speed, the brightness information adjuster gives larger reduction amounts to the first output brightness levels when reproduced at the third reproduction speed, than reduction amounts to the first output brightness levels when reproduced at the fourth reproduction speed.

2. A video reproduction device to reproduce expanded video data whose brightness dynamic range is wider than that of a standard video, the device comprising:
a brightness information adjuster to change first output brightness levels of the expanded video data to respective second output brightness levels,
wherein, when the expanded video data is reproduced at a second reproduction speed faster than a first reproduction speed which is a normal speed, the brightness information adjuster reduces the first output brightness levels to the second output brightness levels, and
wherein in a case where a third reproduction speed and a fourth reproduction speed included in the second reproduction speed are faster reproduction speeds than the first reproduction speed and the third reproduction speed is faster than the fourth reproduction speed, the brightness information adjuster makes a maximum value of the second output brightness levels when reproduced at the third reproduction speed, smaller than a maximum value of the second output brightness levels when reproduced at the fourth reproduction speed.

3. A video reproduction device to reproduce expanded video data whose brightness dynamic range is wider than that of a standard video, the device comprising:
a brightness information adjuster to change first output brightness levels of the expanded video data to respective second output brightness levels,
wherein, when the expanded video data is reproduced at a second reproduction speed faster than a first reproduction speed which is a normal speed, the brightness information adjuster reduces the first output brightness levels to the second output brightness levels, and
wherein the brightness information adjuster changes the first output brightness levels to the second output brightness levels according to a tonemap defining correspondence relation between brightness setting values and the respective second output brightness levels.

4. The video reproduction device according to claim 3, wherein in a case where a third reproduction speed and a fourth reproduction speed are faster reproduction speeds than the first reproduction speed and the third reproduction speed is faster than the fourth reproduction speed, the tonemap is defined so as to give larger reduction amounts to the first output brightness levels when reproduced at the third reproduction speed, than reduction amounts to the first output brightness levels when reproduced at the fourth reproduction speed.

5. The video reproduction device according to claim 3, wherein in a case where a third reproduction speed and a fourth reproduction speed are faster reproduction speeds than the first reproduction speed and the third reproduction speed is faster than the fourth reproduction speed, the tonemap is defined so that a maximum value of the second output brightness levels when reproduced at the third reproduction speed is smaller than a maximum value of the second output brightness levels when reproduced at the fourth reproduction speed.

6. The video reproduction device according to claim 3, wherein the tonemap is defined so that a maximum value of the second output brightness levels is smaller than a maximum value of the first output brightness levels.

7. The video reproduction device according to claim 4, wherein the tonemap is defined so that a maximum value of the second output brightness levels is smaller than a maximum value of the first output brightness levels.

8. A video reproduction method, comprising:
reading expanded video data whose brightness dynamic range is wider than that of a standard video; and
changing to respective second output brightness levels by reducing first output brightness levels of the expanded video data,
wherein, in changing to the second output brightness levels, when the expanded video data is reproduced at a second reproduction speed faster than a first reproduction speed which is a normal speed, the first output brightness levels are reduced to the second output brightness levels, and
wherein in a case where a third reproduction speed and a fourth reproduction speed included in the second reproduction speed are faster reproduction speeds than the first reproduction speed and the third reproduction speed is faster than the fourth reproduction speed, in changing to the second output brightness levels, reduction amounts to the first output brightness levels when reproduced at the third reproduction speed are made larger than reduction amounts to the first output brightness levels when reproduced at the fourth reproduction speed.

9. A video reproduction method comprising:
reading expanded video data whose brightness dynamic range is wider than that of a standard video; and
changing first output brightness levels of the expanded video data to respective second output brightness levels, wherein, in changing the first output brightness levels, when the expanded video data is reproduced at a second reproduction speed faster than a first reproduction speed which is a normal speed, the first output brightness levels are reduced to the second output brightness levels, and wherein in a case where a third reproduction speed and a fourth reproduction speed included in the second reproduction speed are faster reproduction speeds than the first reproduction speed and the third reproduction speed is faster than the fourth reproduction speed, in changing the first output brightness levels, a maximum value of the second output brightness levels when reproduced at the third reproduction speed is made smaller than a maximum value of the second output brightness levels when reproduced at the fourth reproduction speed.

10. A video reproduction method comprising:

reading expanded video data whose brightness dynamic range is wider than that of a standard video; and changing first output brightness levels of the expanded video data to respective second output brightness levels, wherein, in changing the first output brightness levels, when the expanded video data is reproduced at a second reproduction speed faster than a first reproduction speed which is a normal speed, the first output brightness levels are reduced to the second output brightness levels, and wherein the first output brightness levels are changed to the second output brightness levels according to a tonemap defining correspondence relation between brightness setting values and the respective second output brightness levels.

11. The video reproduction method according to claim 10, wherein in a case where a third reproduction speed and a fourth reproduction speed are faster reproduction speeds than the first reproduction speed and the third reproduction speed is faster than the fourth reproduction speed, the tonemap is defined so as to give larger reduction amounts to the first output brightness levels when reproduced at the third reproduction speed, than reduction amounts to the first output brightness levels when reproduced at the fourth reproduction speed.

12. The video reproduction method according to claim 10, wherein in a case where a third reproduction speed and a fourth reproduction speed are faster reproduction speeds than the first reproduction speed and the third reproduction speed is faster than the fourth reproduction speed, the tonemap is defined so that a maximum value of the second output brightness levels when reproduced at the third reproduction speed is smaller than a maximum value of the second output brightness levels when reproduced at the fourth reproduction speed.

13. The video reproduction method according to claim 10, wherein the tonemap is defined so that a maximum value of the second output brightness levels is smaller than a maximum value of the first output brightness levels.

14. The video reproduction method according to claim 11, wherein the tonemap is defined so that a maximum value of the second output brightness levels is smaller than a maximum value of the first output brightness levels.

* * * * *